Nov. 3, 1942.

C. OMAN 2,300,958

SINGLE PHASE VAR METER

Filed June 21, 1940

WITNESSES:

INVENTOR
Carl Oman.
BY
ATTORNEY

Patented Nov. 3, 1942

2,300,958

UNITED STATES PATENT OFFICE 2,300,958

SINGLE PHASE VAR METER

Carl Oman, Cedar Grove, N. J., assignor to Westinghouse Electric & Manufacturing Company, East Pittsburgh, Pa., a corporation of Pennsylvania Application June 21, 1940, Serial No. 341,612

5 Claims. (Cl. 171—34)

The present invention relates to measuring instruments, and it has particular relation to a device for measuring reactive power by means of an instrument calibrated to measure active power.

It is well known in the art that an ordinary watt meter will indicate vars or reactive power, if the voltage of the potential coil is displaced 90 electrical degrees. While this 90 degree displacement may be obtained by methods such as that employing a reactance in series with the voltage coil, such arrangements simultaneously cause a reduction in the voltage across the coil. As a result it has been necessary either to recalibrate the instrument for measuring reactive power or to employ transformer equipment to provide the desired voltage drop across the coil. Although the transformer arrangement eliminates the need for recalibration, it is itself subject to objections because of the expense involved as well as other disadvantages.

According to the present invention, a phase shifting arrangement is utilized which provides the required voltage as well as the required phase shift. By means of this arrangement it is possible to use a conventional watt meter for measuring vars or reactive volt amperes in an electric circuit without employing a transformer or recalibrating the instrument.

It is, accordingly, an object of the present invention to provide a novel and improved device for measuring reactive power.

It is another object of the invention to provide an improved arrangement whereby reactive power may be measured by means of an instrument calibrated to measure active power.

A further object of the invention is to provide a device which, without requiring a transformer, permits measurement of reactive power by means of a watt meter calibrated to indicate active power.

Other objects and advantages of the invention will appear from the following detailed description taken in conjunction with the accompanying drawing, in which.

Figure 1:
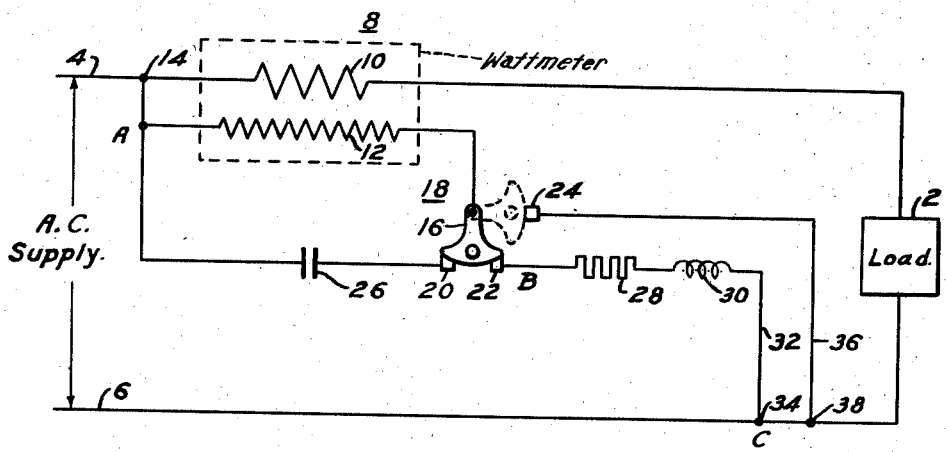
Figure 1 is a circuit diagram of an embodiment of the present invention.

In Fig. 1 an electrical load 2 is supplied from an alternating current supply by means of a pair of conductors 4 and 6. A conventional watt meter 8 which is calibrated to indicate watts includes a current coil 10 which is connected in series with the load 2 and a voltage coil indicated at 12. One end of the voltage coil 12 is electrically connected to the conductor 4 at 14, while the other end is attached to the movable member 16 of a switch indicated generally at 18. In addition to the movable member the switch includes stationary contacts 20, 22 and 24. Stationary contact 20 is connected to one side of a condenser 26, the other side of which contacts the line 4 at 14. A series circuit including a resistance 28 and an inductance 30 is connected at one end to the contact 22, while the other end is attached through a conductor 32 to the line 6 at 34. The stationary contact 24 is connected by means of the conductor 36 to the line 6 at 38.

The switch 18 is provided with two operating positions, in one of which the movable member 16 bridges contacts 20 and 22 and connects the phase shifting circuit 26, 28 and 30 for energization. In the other position, the member 16 contacts only the stationary contact 24 as shown in dotted lines, and thus places the voltage coil 12 directly across the conductors 4 and 6. It will be understood that the switch is placed in the first described position when it is desired to measure reactive power or vars, while active power or watts will be indicated when the member 16 is in the dotted position.

Figure 2:
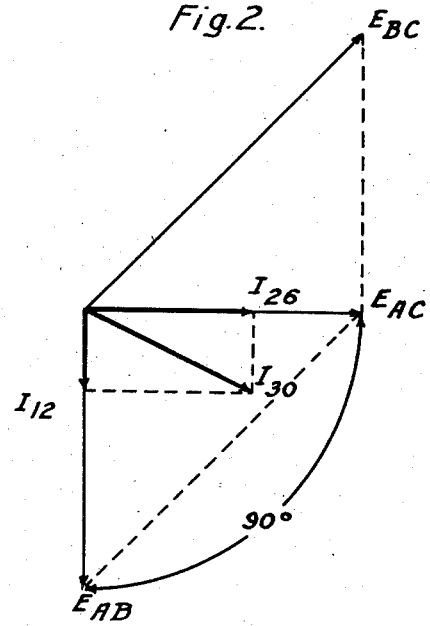
Fig. 2 is a vector diagram illustrating the electrical characteristics of the device shown in Fig. 1.

The values of the capacitor 26, resistance 28, and inductance 30 are such that when associated with the voltage coil 12, the voltage across the coil is numerically equal to but displaced 90 electrical degrees behind the voltage across the line. This relationship will be better understood upon reference to Fig. 2 which shows the vector relationship between the various quantities for a dynamometer type instrument in which the voltage circuit is substantially all resistance. In this diagram the horizontal vector $E_{AC}$ represents in phase and magnitude the voltage across the line or from the characters A to C on the diagram of Fig. 1. The vector $E_{AB}$, which is equal to the vector $E_{AC}$ and lags it by 90 electrical degrees, represents the voltage across the circuit including the voltage coil 12 and capacitor 26 in parallel or between the characters A and B in Fig. 1. Since the coil 12 is substantially all resistance, the current therethrough is substantially in phase with $E_{AB}$ and may be represented by the vector $I_{12}$. The current through the capacitor 26 leads the voltage $E_{AB}$ by substantially 90 degrees and is represented by $I_{26}$ while the current through resistance 28 and inductance 30 is equal to the vector sum of $I_{12}$ and $I_{26}$ which is represented by $I_{30}$. The voltage across this latter portion of the circuit leads the current $I_{30}$ as indicated by the vector $E_{BC}$. The vector difference between $E_{AC}$ and $E_{BC}$ is of course equal to $E_{AB}$.

It will be understood that this device may be employed equally well with instruments wherein either the voltage and current coil, or both, are energized through transformers instead of directly from the line. Although the device is particularly applicable to dynamometer type instruments wherein the voltage coil is practically pure resistance, it may, in addition, be applied to induction type instruments.

From the foregoing description it will appear that the invention provides an inexpensive and convenient device for measuring reactive power with an instrument calibrated for active power. Thus an ordinary watt meter may be used to indicate reactive volt amperes on its regular scale without the necessity of employing transformer equipment in conjunction with the phase shifting arrangement.

Although the invention has been described in connection with a specific embodiment, it will be understood that modifications may be made therein without departing from its spirit and scope. Consequently, the invention is to be limited only by the appended claims interpreted in view of the prior art.

I claim as my invention:

1. A device for measuring the reactive power in an alternating current load circuit comprising a wattmeter including a current coil circuit and a voltage coil circuit, means for energizing said current coil circuit in accordance with the current in said load circuit, a capacitive reactance, an inductive reactance, a resistance, means connecting one of said reactances in shunt with said voltage coil circuit, means connecting the other said reactance and said resistance in series arrangement with said shunt circuit, and means for energizing said series circuit in proportion to the voltage across said load circuit, said reactances and said resistance being of such values that the voltage across said voltage coil circuit is substantially equal to but displaced substantially ninety electrical degrees from the voltage across the entire said series circuit.

2. A device for measuring the reactive power in an alternating current load circuit comprising a wattmeter calibrated for displacement in a predetermined direction to measure the active power in said circuit and including a current coil circuit and a voltage coil circuit, means for energizing said current coil circuit in accordance with the current in said load circuit, a capacitive reactance, an inductive reactance, a resistance, means connecting said capacitive reactance in shunt with said voltage coil circuit, means connecting said inductive reactance and said resistance in series arrangement with said shunt circuit, and means for energizing the series circuit formed by the last said means in proportion to the voltage across said load circuit, said reactances and said resistance being of such values as to shift the voltage across said voltage coil circuit to a phase position substantially ninety electrical degrees behind the voltage across the entire said series circuit while maintaining it at substantially the same magnitude.

3. A device for measuring the reactive power in an alternating current load circuit comprising a dynamometer type wattmeter calibrated to measure the active power in said circuit and including a current coil circuit and a voltage coil circuit, means for energizing said current coil circuit in accordance with the current in said load circuit, a capacitive reactance, an inductive reactance, a resistance, means connecting one of said reactances in shunt with said voltage coil circuit, means connecting the other said reactance and said resistance in series arrangement with said shunt circuit, and means for energizing the series circuit formed by said last named means with a voltage proportional to the load circuit voltage, said reactances and said resistance being of such value that the voltage across said voltage coil circuit is substantially equal to but displaced substantially ninety electrical degrees from that across the entire said series circuit.

4. A device for measuring the reactive power in an alternating current load circuit comprising a dynamometer type wattmeter including a current coil circuit and a voltage coil circuit, means for energizing said current coil circuit in accordance with the current in said load circuit, a capacitive reactance, an inductive reactance, a resistance, means connecting said capacitive reactance in shunt with said voltage coil circuit, means connecting said inductive reactance and said resistance in series arrangement with said shunt circuit, and means for energizing the series circuit formed by said last named means with a voltage proportional to the load circuit voltage, said reactances and said resistance being of such values that the voltage across said voltage coil circuit is substantially equal to but displaced substantially ninety electrical degrees behind that across the entire said series circuit.

5. A device for measuring the reactive power in an alternating current load circuit comprising a dynamometer wattmeter calibrated to measure the active power in said circuit and including a voltage coil circuit having substantially unity power factor and a current coil circuit, means for energizing said current coil in accordance with the current in said load circuit, a capacitance, means connecting said capacitance in shunt with said voltage coil circuit, an inductance, a resistance, means connecting said inductance, said resistance and the shunt circuit made up of said voltage coil circuit and said capacitance in series arrangement, and means connecting the series circuit formed by said last named means for energization in accordance with the voltage across said load circuit; said capacitance, inductance, and resistance being of such relative magnitudes that the voltage across said voltage coil circuit is substantially equal to but displaced substantially ninety electrical degrees behind the voltage across the entire said series circuit.

CARL OMAN.